United States Patent Office 3,425,221
Patented Feb. 4, 1969

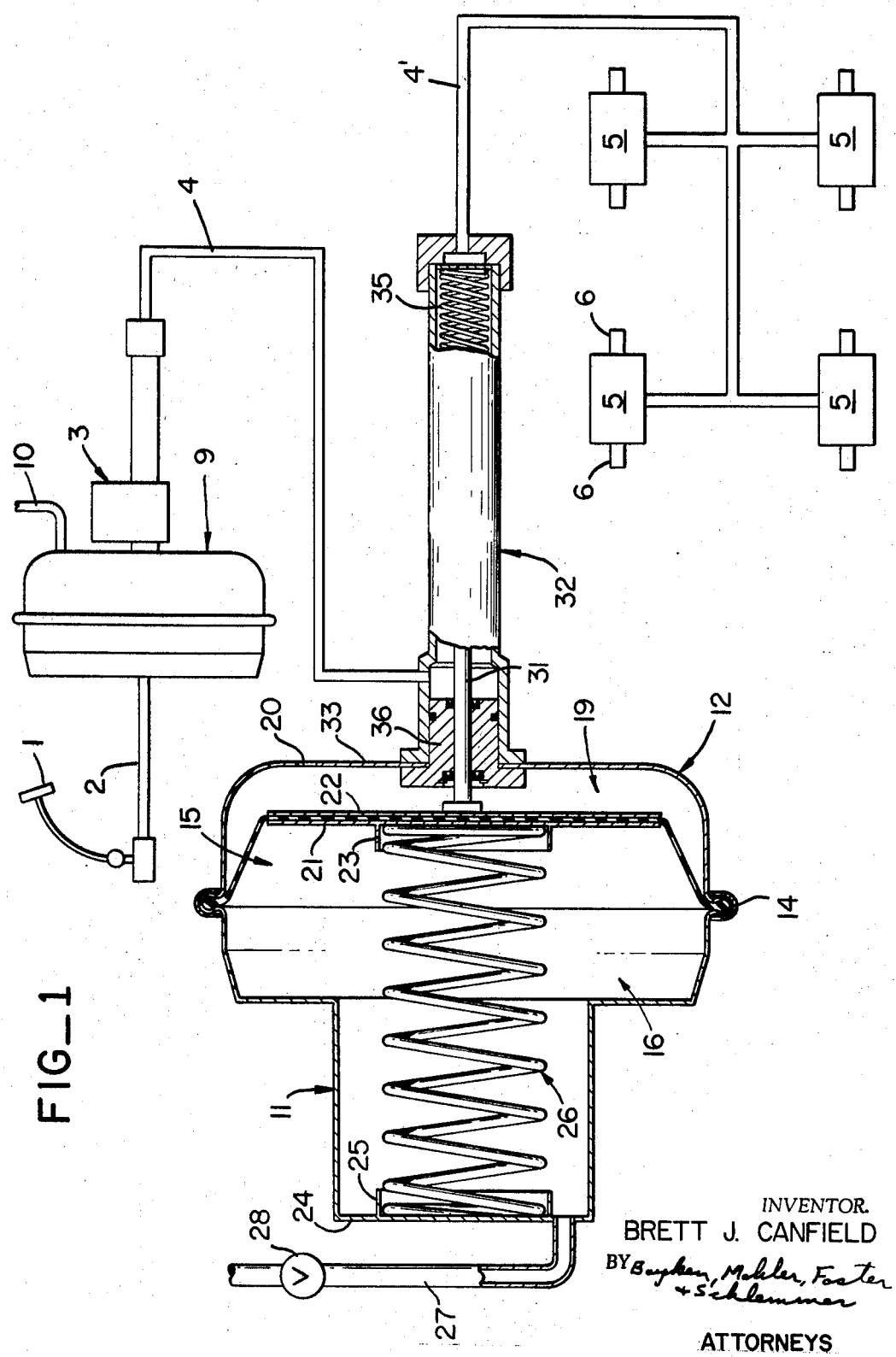

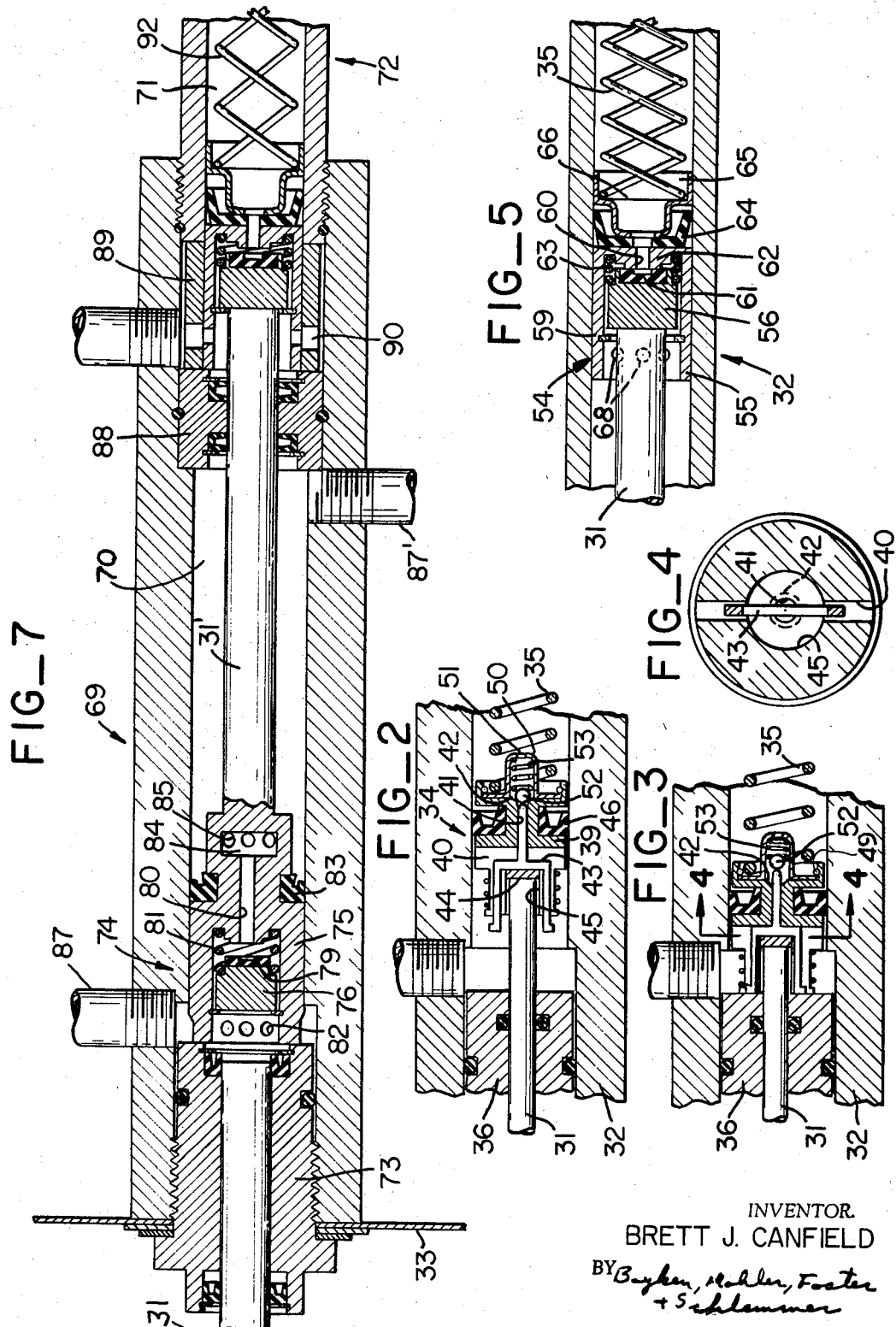

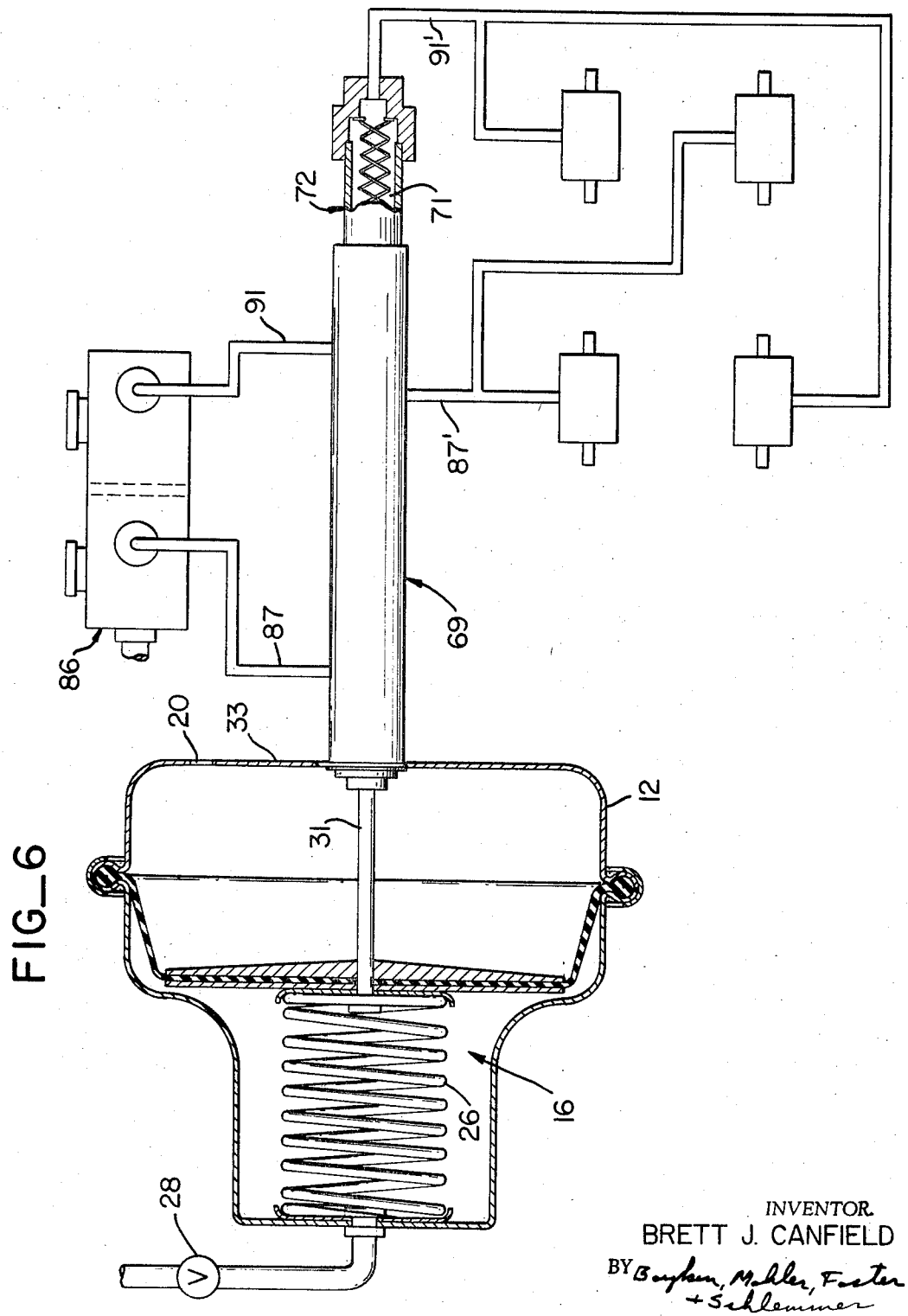

3,425,221
SAFETY AND PARKING VEHICLE
BRAKING DEVICE
Brett J. Canfield, San Francisco, Calif., assignor of seventy-five percent to John M. Graham, Oakland, and twenty-five percent to Elvin D. Neill, Fremont, Calif.
Filed Oct. 20, 1966, Ser. No. 588,086
U.S. Cl. 60—54.5                                9 Claims
Int. Cl. F15b 15/18; B60t 17/06; B60r 25/08

ABSTRACT OF THE DISCLOSURE

In a hydraulic braking system, the inclusion of an independently actuatable brake actuating device which is deactuated by application of vacuum and actuated by the release of vacuum and application of yieldable means independently of other means of actuating said braking system.

---

The present invention relates to a device for use in a standard or power assisted hydraulic braking system for motor vehicles and more particularly to a spring actuated mechanical device for hydraulically applying safety and parking braking power for a motor vehicle.

It is anticipated that the device of the present invention will be used in motor vehicles wherein there is provided a hydraulic braking system. Presently, in vehicles using hydraulic braking systems, parking braking power is applied by a mechanical arrangement whereby a lever in the cab or cockpit of a given vehicle is actuated by foot or hand. One end of said lever is connected to a cable or plurality of cables which in turn lead to the vicinity of the wheels or the axel of the vehicle. In most automobiles these cables lead only toward the rear axel of the vehicle. At the end of these cables opposite the aforementioned lever said cables are connected to some sort of cranking device which in turn is connected to and operates any of a number of different varieties of camming devices, which camming devices are positioned between the lower ends of the brake shoes on most vehicles.

When the lever is actuated, the cables are drawn to actuate the cranking device which in turn actuates the camming device to spread the lower ends of the brake shoes applying a braking power to the brake drums surrounding the shoes. Any reasonable and practicable amount of pressure which can be applied to the lever is, except in rare instances, insufficient to act as a true emergency brake on most vehicles and is insufficient as a parking brake to keep most vehicles from rolling when the vehicle is parked on an incline. Other devices may apply a braking force to the vehicle drive shaft or axel.

It should be understood that the device of the present invention is not merely a fluid trap such as the type currently used as a parking brake on some vehicles. In the operation of a fluid trap the driver of a vehicle first applies a braking pressure with a foot pedal and after the hydraulic pressure is built up the driver then actuates a valve which traps hydraulic fluid in the expanded wheel cylinders maintaining the braking force. There is no compensation for expansion or contraction of trapped fluid nor is there means for maintaining the pressure of the trapped fluid below a predetermined safe pressure level.

The present device can be likened to insrting a second, independently actuable master cylinder in the hydraulic fluid line between the service master cylinder and the wheel cylinders.

It is therefore the main object of the present invention to provide an economical, easily installed, and easily actuated mechanical device which is used in conjunction with the existing hydraulic braking system of a given vehicle to provide a sufficient amount of power through the hydraulic system for emergency and parking braking situations.

It is another object of the present system to provide an auxiliary braking device such as that above described for use in conjunction with a hydraulic braking system, which auxiliary device will apply the same predetermined braking force upon every actuation thereof, and which force is applied consistently and without regard to the physical capabilities of the individual actuating the device of the present invention.

It is yet another object of the present invention to provide an auxiliary safety and parking device for use with a hydraulic braking system, which device can be used with either a single or dual master cylinder braking system.

Still another object of the present invention is to provide a safety and parking device for use with a hydraulic braking system, which device is upon actuation completely automatically controlled to maintain a predetermined braking force.

Yet another object of the present invention is to provide an auxiliary safety and parking device for use in conjunction with hydraulic braking systems, which device will provide a sufficient and steady braking force in emergency braking situations which force is many times greater than that normally applied with prior mechanical arrangements, and to provide the sufficient force for vehicle parking situations, which force is sufficient to hold the vehicle to which the device of the present invention is adapted on any incline.

Other object and advantages of the present invention will be apparent from the following description taken in conjunction with the drawings.

In the drawings, FIG. 1 is a side elevation view, partially broken away and sectioned of the device of the present invention, which device is schematically illustrated in conjunction with a power assisted, single master cylinder hydraulic braking system.

FIG. 2 is an enlarged, fragmentary, elevational view in section of one form of the present invention which structure would be included within the elongated cylinder shown partially in elevation in FIG. 1.

FIG. 3 is similar to FIG. 2 except illustrating a different position of the structure of FIG. 2 which would be included within the aforementioned cylinder illustrated partially in elevation in FIG. 1.

FIG. 4 is a cross-sectional view taken along line 4—4 of FIG. 3.

FIG. 5 is a fragmentary, sectioned elevational view of a modified form of the structure of FIGS. 2 and 3.

FIG. 6 is similar of that of FIG. 1 but illustrating a form of the present invention which would be used in a dual master cylinder hydraulic braking system.

FIG. 7 is an enlarged fragmentary sectional view of the structure which is contained in the elongated cylinder, substantially all of which is shown in elevation in FIG. 5.

In general, and referring to FIG. 1, in a hydraulic braking system there is some form of cabin or cockpit located foot pedal 1 which is mechanically connected to a rod 2 which rod in turn extends into a master cylinder 3. When foot pedal 1 is depressed rod 2 actuates a piston within master cylinder 3 to apply hydraulic pressure through a line 4 to a set of wheel cylinders 5. When hydraulic pressure is applied to cylinders 5 the piston rods 6 thereof, which are generally connected to the upper ends of a pair of brake shoes, are forced outwardly thereby extending the brake shoes to which they are connected into frictional engagement with the brake drum which extends around said shoes.

The pressure required to be applied to pedal 1 to brake a given vehicle can be considerably reduced by the addition of the vacuum power booster generally designated 9 which power booster in effect takes advantage of the vacuum of the intake manifold through tube 10 connecting the booster 9 with said manifold to aid in applying pressure to the piston within master cylinder 3. The addition of a vacuum power booster such as that schematically illustrated in FIG. 1 converts a standard hydraulic braking system into what is commonly called the power braking system.

Without disrupting any of the braking system of a given vehicle, whether it be standard or power assisted, the device of the present invention is installed at some point in line 4 between the master cylinder 3 and the wheel cylinders 5.

In detail, the device of the present invention consists of a pair of hollow pan shaped members 11 and 12 the opened rims or lips of which are of the same diameter. Members 11 and 12 are adapted to be secured together at their rims by a circular clamp 14 to form a cylindrical chamber divided by a flexible diaphragm member 15.

Diaphragm 15 is secured in place between the lips of members 11 and 12 in the manner illustrated in FIG. 1 and acts to divide the chamber formed by members 11 and 12 into a sealed chamber 16 and a chamber 19 which is opened to atmospheric pressure through port 20 which is formed in a wall of member 12.

Centrally secured to either side of diaphragm 15 are a pair of reinforcing plates 21 and 22. Reinforcing plate 21 may have a cylindrical cup shaped member 23 thereon projecting from the surface of said plate away from the direction of diaphragm 15.

At the end of member 11 opposite the opened lip thereof, said member may be formed with a base plate 24 which may have a cylindrical cup shaped member 25 projecting therefrom in the direction of and substantially the same size and in alignment with cup shaped member 23 on reinforcing plate 21. Cup shaped members 23 and 25 are adapted to receive and retain in position between reinforcing plate 21 and base plate 24 a helical coil spring 26, which spring reacts between base plate 24 and diaphragm 15 with considerable force.

Sealed chamber 16 formed by member 11 and diaphragm 15 is adapted to be connected through a line 27 to a source of negative or vacuum pressure which is supplied by the intake manifold of the motor in the vehicle on which the present braking system is used. At some point between sealed chamber 16 and the intake manifold (not shown) line 27 may pass the vicinity of the instrument panel or some other convenient location in the cab of the vehicle in question, at which point said line may pass through valve 28 which can be manually actuated by the driver of such vehicle.

When valve 28 is so positioned to connect sealed chamber 16 with the vacuum or source of negative pressure provided by the intake manifold, the pressure in chamber 16, is reduced sufficiently to allow atmospheric pressure acting against diaphragm 15 to collapse spring 26 as is generally illustrated in FIG. 6.

When valve 28 is actuated to disconnect sealed chamber 16 from the source of negative pressure and connect said chamber to atmospheric pressure spring 26 expands forcing flexible diaphragm 15 to the position generally illustrated in FIG. 1.

Connected to reinforcing plate 22 at the side of diaphragm 15 opposite to spring 26 is a rod 31 which extends out of chamber 19 formed by member 12 and diaphragm 15 and into a cylinder 32 which is centrally secured to and extends outwardly from the endplate 33 of member 12. Within cylinder 32 rod 31 engages a piston which, upon actuation of spring 26 by disconnecting sealed chamber 16 from the source of negative pressure, applies hydraulic pressure to wheel cylinders 5 independently of any pressure applied by foot pedal 1 as will be described below in greater detail.

It should be noted at this point that spring 26 is collapsed by negative pressure being provided in sealed chamber 16 and at such time the brake applying device of the present invention is in an inoperative position. In other words air pressure is not used to actuate the device of the present invention but rather negative air pressure is used to render the present device inoperative. When the device is in an inoperative state, hydraulic fluid from master cylinder 3 is free to enter cylinder 32 from line 4 and pass through and out of said cylinder into line 4' and thence to the wheel cylinders without obstruction from the device of this invention and without obstructing normal, foot pedal actuated, braking operations. It should be noted that spring 26 is never completely compressed, thereby prolonging life by avoiding spring fatigue.

Within cylinder 32 and adapted to be engaged by rod 31 is a piston member generally designated 34, one form of which is illustrated in FIGS. 2–4. When the device of the present invention is in an inoperative state, and diaphragm 15 and rod 31 are withdrawn as generally illustrated in FIG. 6, the piston member 34 is spring-urged by spring 35 to a withdrawn position wherein the end thereof opposite spring 35 abuts some form of locking nut 36 which is used to secure cylinder 32 to endplate 33 of member 12. Withdrawal of piston member 34 may also be effected by securing said member to the end of rod 31.

The position of piston member 34 when the device of the present invention is in an inoperative position somewhat resembles the position of said member illustrated in FIG. 3, however, the end of rod 31 which engages piston member 34 may be withdrawn therefrom somewhat unless it is secured thereto as suggested above.

Piston member 34 consists of several pieces, the principal one of which is a single base piece 39 which extends substantially the full length of piston member 34. Referring to the left hand end of piece 39 as seen in FIGS. 2 and 3 as the rearward end thereof, said piece has a slot 40 cut diagonally therein, which slot extends forwardly about half the length of piece 39. A bore 41 of substantially the same diameter as the width of slot 40 extends from the termination of said slot forwardly along the longitudinal axis of piece 39 to the leading end thereof terminating at that point in a countersunk ball valve seat 42.

Received in slot 40 and bore 41 of piece 39 is a loose fitting fork shaped member 43 with the flat handle thereof loosely received in bore 41 and the forked tines thereof loosely received in slot 40 as can best be seen in FIG. 4. Fork shaped member 43 is held in its position in member 39 by a plug 44 which is secured within the closed end of a rearwardly opening bore 45 which is axially aligned with and larger than bore 41 but at the rearward end of member 39. Bore 45 is of sufficient diameter to loosely receive the end of rod 31 therein.

The tines of member 43 are footed and extend rearwardly slightly farther than the rearwardmost end of member 39 when piston member 34 is in an actuated position (FIG. 2). A light coil spring extending around an area of lesser diameter of member 39 toward the rearward end thereof assists in holding fork shaped member 43 in place.

Fitted within an area of lesser diameter intermediate the ends of member 39 is a forwardly facing cup washer 46 which prevents the passage of any hydraulic fluid past piston member 34 when said member is actuated. Secured within a large counterbore at forward end of member 39 by a locking ring 49 is a valve housing cup 50 which has an aperture 51 in the forwardmost end thereof. Within valve housing cup 50 is a ball 52 which is adapted to be urged to be in sealing engagement with valve seat 42 by a small coil spring 53.

It can be seen that when valve member 34 is pushed rearwardly to an inactive or an inoperative position similar to that illustrated in FIG. 3, the footed tines of member 43 will first engage the end of nut 36 and the handle of fork shaped member 43 will force ball 52 out of engagement with valve seat 42. Since fork shaped member 43 is sufficiently loosely received in slot 40 and bore 41 hydraulic fluid entering cylinder 32 through line 4 is free to pass through piston 34. This is generally what is illustrated in FIG. 3.

Thus, with the spring 26 of the present device in the collapsed position and with piston member 34 in an inoperative position hydraulic fluid is free to pass through cylinder 32 in normal braking operations which are actuated by pedal 1.

However, when valve 28 is actuated to remove the source of negative pressure from sealed chamber 16 and allow atmospheric pressure to enter that chamber, spring 26 expands driving the end of rod 31 into engagement with the rearward end of piston member 34. At this point the piston member will be advanced away from the forward end of locking nut 36 and spring 53 will force ball 52 into engagement with valve seat 42 thereby forcing fork shaped member 43 rearwardly. As the piston member 34 is driven forwardly, ball 52 and washer cup 46 prevent any hydraulic pressure from escaping rearwardly past piston member 34 and thus all of the force of spring 26 is applied to the fluid within cylinder 32 to expand wheel cylinders 5 in a braking operation.

Valve 28, accessible to the driver of the vehicle in which the present braking system is used, can be actuated at any time to remove the source of negative pressure from sealed chamber 16 and allow atmospheric pressure to enter said chamber thereby actuating the present braking device. This can be done while the vehicle is moving in an emergency stopping situation where the pressure of pedal 1 may be too soft as well as when the vehicle is standing still in a parking brake operation.

On vehicles such as large cars and small trucks it has been found that a spring 26 capable of yielding about 200 lbs. of pressure is sufficient for emergency stopping and all parking situations. It has also been found that in most situations it is desirable to have about 750 lbs. per square inch of hydraulic pressure between the wheel cylinders and the forward side of piston member 34 to assure controlled stopping in an emergency situation and to insure absolute safety when the present device is used as a parking brake. This is considerably more pressure than can be applied by the average driver to the standard mechanical type emergency and parking brake found in most vehicles. The pressures stated are examples and should not be considered restrictive.

In order to deactivate the auxiliary braking device of the present invention it is necessary to manually actuate valve 28 so that sealed chamber 16 is again connected to a source of negative pressure thereby evacuating the chamber formed by member 11 and diaphragm 15. This evacuation takes place in only a moment's time and diaphragm 15 is forced by the atmospheric pressure entering chamber 19 through port 20 to the position generally illustrated in FIG. 6 thereby collapsing spring 26 and withdrawing rod 31. As rod 31 is withdrawn spring 35 expands to force piston member 34 and the footed tines of fork shaped member 43 into engagement with the forward end of nut 36 thereby again making cylinder 32 simply a conduit for hydraulic fluid in normal foot pedal actuated braking operations.

At this point it should be noted that the particular construction of member 34 plays a double role in many parking situations. One such situation may be where the vehicle incorporating the present braking system is brought to a fast stop by the use of the foot pedal alone. It is not at all unusual to generate as much as 1500 lbs. per square inch of pressure in the hydraulic braking system of a given vehicle on such fast stops. Most hydraulic systems are made to take as much pressure and more on a short term basis but if such pressure were held for a length of time, and especially in older braking system, any weak spots in the system might spring leaks causing a loss of hydraulic pressure and a failure of the braking mechaniism. Very often such trouble spots are in the cup seals of the master cylinder in the wheel cylinders.

Thus, it can be seen that if foot pedal 1 were slammed down in a fast stopping situation building up say 1500 lbs. of pressure in the braking system, and if valve 28 were then actuated to allow spring 26 to expand before the pressure was relieved from pedal 1, the pressure in the system between the forward side of cylinder 34 and the wheel cylinders would be substantially greater than the pressure capable of being generated by spring 26 which in the normal situation would be approximately 750 lbs. per square inch. Thus, piston number 34 would be forced rearwardly as seen in FIG. 3 by the greater pressure on the forward side as opposed to the pressure of spring 26 on the rearward side. As piston member 34 approaches the forward end of nut 36 against the urgency of spring 26 the footed tines of fork shaped member 43 will engage said forward surface of nut 36 forcing ball 52 out of valve seat 42 and allowing hydraulic fluid to pass through member 34 from the high pressure side to the low pressure side. When a sufficient amount of fluid has passed through piston member 34 to equalize the pressures on both sides of piston member 34, force of spring 26 will again advance piston member 34 assuring that at least 750 lbs. of braking force remain in the wheel cylinders.

Even where a vehicle has not been stopped in such a manner as to create an area of high pressure forwardly of piston member 34, changes in atmospheric conditions and temperature may cause an expansion of fluids trapped on the forward side of piston member 34 when the present braking device is actuated. In such a situation piston member 34 will react in exactly the same manner as that above described to relieve the pressure. If a later change in atmospheric conditions causes a contraction of the fluids trapped forwardly of piston member 34, spring 26 can force piston member nearly the entire length of cylinder 32 to assure that sufficient braking pressure is maintained.

It should be understood that the figure of 750 lbs. of braking pressure is arbitrarily chosen and that the pressure required for safe emergency stopping and parking may vary from vehicle to vehicle.

It should also be noted that proper seals are provided where needed such as around rod 31 and around locking nut 36 to prevent the unintentional escape of any hydraulic fluid from cylinder 32. Bleeding points are also provided throughout the system where needed to assure the absence of any air from the system.

A modified form of piston member 54 for use in cylinder 32 is illustrated in FIG. 5. With modified piston member 54 rod 31 is received in a hollow rearwardly opening base piece 55 thereof wherein the end of rod 31 engages the rearwardly directed end of the valve plunger 56 which plunger is retained within hollow base piece 55 by a locking ring 59. Valve plunger 56 is sufficiently loosely received within base piece 55 to allow hydraulic fluid to pass therearound and out of the forward end of base piece 55 through an aperture 60. Secured in a recess formed in the forward end of valve plunger 56 is an elastic valve member 61, which valve member is adapted to enter into sealing engagement with a valve seat 62 formed around aperture 60 when said valve member is forced into engagement with said valve seat by the action of spring 26 on rod 31. When the device of this invention is in an inoperative position valve member 61 is forced away from valve seat 62, allowing fluid to pass through aperture 60, by the action of a small coil spring 63 reacting between valve plunger 56 and the inner side of the forward end of base piece 55.

Secured to the forward side of the closed end of base member 55 is a forwardly opening elastic cup washer 64 which has an aperture therein which forms an extension of aperture 60 in base member 55. Cup washer 64 is adapted to resist the flow of hydraulic fluid rearwardly past piston member 54 when the braking device of the present invention is actuated. Forwardly of cup shaped washer 64 is a forwardly opening, rigid cup shaped member 65 having an aperture therein which is an extension of aperture 60 in base piece 55. Cup 65 is formed with portions of greater and smaller diameters joined by a shoulder 66 which acts as a seat for coil spring 35.

The operation of the piston member 54 illustrated in FIG. 5 is substantially the same as that of piston member 34 illustrated in FIGS. 2 through 4. When negative pressure is applied to chamber 16, atmospheric pressure entering chamber 19 through port 20 forces diaphragm 15 to the position generally illustrated in FIG. 6 thereby collapsing spring 26. This withdraws rod 31 (FIG. 5) allowing spring 35 to force piston member 54 rearwardly until the rearwardmost edge thereof engages the forward surface of locking nut 36.

With rod 31 withdrawn, spring 63 forces valve member 61 out of engagement with valve seat 62 and hydraulic fluid entering cylinder 32 from line 4 can pass through plurality of apertures 68 formed in side wall of base piece 55, pass around valve plunger 56 and through aperture 60 thereby bypassing by auxiliary braking device of the present invention in normal pedal actuated braking operations.

However, when valve 28 is actuated to allow spring 26 to expand, rod 31 is driven against the rearward side of valve plunger 56 thereby sealing off aperture 60 by the engagement of the valve member 61 with seat 62. The combination of cup shaped washer 64 and the sealing off of aperture 60 prevents any hydraulic fluid from passing rearwardly of piston member 54 and the fluid trapped forwardly thereof is forced by spring 26 into the wheel cylinders 5 in a braking operation, be it for use in emergency braking or in normal parking braking operation.

Yet another form of the present invention, one particularly adapted to use in hydraulic systems which make use of a dual master cylinder, is illustrated in FIGS. 6 and 7. For all practical purposes the actuation and deactuation of the device is exactly as has been described in the previous modifications and the differences in the modifications of FIGS. 6 and 7 reside within the cylinder 69 which is similar to cylinder 32 in the previously described forms of the present invention.

In a dual master cylinder mode of operation of hydraulic braking system, independent sources of hydraulic fluid are provided for each axle of a vehicle or, in some cases, the hydraulic fluid from one of the two separate sources will be applied to one wheel of one axle and the diagonally opposite wheel of the second axle with the fluid from the remaining independent source being provided to the remaining wheels.

The dual master cylinder system represents a considerable safety advance in that if the hydraulic pressure of one set of wheels in ineffective for any reason, a separate source of hydraulic pressure is available to the remaining set of wheels and is more than adequate for safe stopping in most situations.

The modification of the present invention illustrated in FIGS. 6 and 7 is intended to maintain the safety advantages of a dual master cylinder system by maintaining the separate nature of the separate sources of hydraulic fluid.

The cylinder 69 is divided into two separate chambers 70 and 71 with the majority of chamber 71 being provided by an extension 72 which is secured to cylinder 69. The two chambers are of equal displacement in operation and allowance is made for the various rods or springs which may be contained within said chambers.

In detail, and referring primarily to FIG. 7, cylinder 69 may be secured to endwall 33 of an atmospheric chamber forming member such as 12 by locking nut 73 which is similar to nut 36. Rod 31 is adapted to pass through the center of locking nut 73 and both the nut and the rod are sealed against passage of hydraulic fluid. With negative pressure applied to chamber 16 and spring 26 collapsed and rod 31 withdrawn, the rearward end of piston member 74 engages the forward end of locking nut 73. For all practical purposes piston member 74 is similar to and functions like piston member 54 in FIG. 5. It has a base piece 75, a valve plunger 76 which is loosely retained within said base piece by a locking ring, a valve member 79 in the forward end of said valve plunger, an aperture 80 in the forward end of said base piece 75 which is formed with a valve seat therearound which is adapted to be engaged and closed by valve member 79, a spring 81 acting between the forward end of base piece 75 and valve plunger 76 to urge valve member 79 out of engagement with the seat around aperture 80, and a plurality of apertures 82 in the rearward end of base piece 75 to allow hydraulic fluid to flow therethrough. Aperture 80 passes forwardly through a portion of base piece 75 which is restricted in diameter and around which is secured forwardly facing cup washer 83 to resist the flow of hydraulic pressure rearwardly past piston member 74. Aperture 80 terminates at its forward end in a chamber 84 which has a plurality of radial openings 85 therein which allows hydraulic fluid to pass from aperture 80 into chamber 70. Secured to the forward end of base piece 75 of piston member 74 is a rod 31' which is similar in configuration and purpose to rod 31.

Hydraulic fluid enters chamber 70 from one side of the dual master cylinder 86 (FIG. 6) through a line 87 and passes out of the forward end of chamber 70 through a line 87'.

Rod 31' passes forwardly from chamber 70 into chamber 71 through a plug 88. Plug 88 is properly sealed at the peripheral thereof and where rod 31' passes therethrough to insure that no hydraulic fluid passes between chambers 70 and 71.

Plug 88 is secured in place within cylinders 69 and against a shoulder formed by the intersection of a counterbore formed in the forward end cylinder of 69 with the bore of chamber 70. Member 72 may be threadedly secured within cylinder 69 and the spacer 89 between said member 72 and said plug 88 forces said plug into secure engagement with said aforementioned shoulder. Spacer 89 may also be nothing more than an extension of member 72 and in either case said spacer is formed with a plurality of openings or slots 90 therein which allow hydraulic fluid to enter chamber 71 from a line 91 (FIG. 6) leading from master cylinder 86.

Located within chamber 71 is a piston member which may be the same in construction and operation as the modified piston member 54 of FIG. 5 and which will not be again described here.

It will suffice to say with respect to chamber 71 that when the device of the present invention is subjected to negative pressure and is therefore inoperative, hydraulic fluid enters chambers 71 from line 91 and then passes through slots 90 in spacer 89, through the apertures in the base piece of the piston member, and then through the piston member into chamber 71. From chamber 71 hydraulic fluid passes through a line 91' to the wheel cylinders. When negative pressure is applied to chamber 16 and the device of the present invention is inoperative both piston member 74 within chamber 70 as well as the piston member in chamber 71 are forced to their rearward or inoperative positions by a coil spring 92 which may be within chamber 71 only or one of which may be in each of the chambers 70 and 71. The piston members and the valve plungers can be withdrawn by being connected to their respective rods 31 and 31'.

When atmospheric pressure is allowed to enter chamber 16 by the actuation of valve 28 and spring 26 expands, rod 31 engages the rearward surface of valve plunger 76 causing valve member 79 to seal aperture 80 closed at the valve seat surrounding aperture 80. This also transmits the force of spring 26 to rod 31' which engages the rearward end of the valve plunger of the piston member within cylinder 71. The combination of the closed apertures in each chamber and the forwardly opening cup valves in each chamber prevents the passage of any hydraulic fluid rearwardly past the piston member in each of the chambers 70 and 71 and the fluid independently trapped in each chamber is then forced by spring 26 through lines 87' and 91' respectively to their separate sets of wheel cylinders.

It should be noted that the piston member 34 of FIG. 2 is also adaptable for use in a dual master cylinder system.

Thus it can be seen that the device of the present invention is perfectly adaptable to use in hydraulic braking systems incorporating a dual master cylinder, and as a safety feature, when pressure is lost to half of the system, it is doubled in the remaining half.

As an added precaution in braking systems which do not yet incorporate a dual master cylinder, the ease of installation of the device of the present invention permits one of such devices to be installed for each axle, each of which can be operated by a single valve on the instrument panel of the cab or cockpit of the vehicle in question. Referring to FIG. 1, in a hydraulic braking system which does not yet include a dual master cylinder, it is also possible to install a valve commonly known in the art as a divider valve at a point intermediate to the device of this invention and the wheel cylinders, which valve will split the flow of hydraulic fluid to two separate predetermined sets of wheel cylinders and which valve is self-sealing against either of the predetermined sets of wheel cylinders which may suffer a loss of hydraulic pressure.

It is to be understood that the above detail description discloses and describes the preferred forms of the present invention but it is not intended to be limiting, as other forms and modifications may occur to those skilled in the art which do not depart from the spirit of this invention and which come within the scope of the appended claims.

I claim:

1. In a hydraulic braking system having a closed conduit containing liquid, conventional movable brake actuating means connected with said conduit responsive to increases in pressure of said liquid for movement to actuate the braking means of said system when applied, and a conventional master cylinder connected with said conduit and actuatable by an operator for applying said pressure, the improvement that includes:
    (a) a member in said conduit movable for opening and closing said conduit at a point between said brake actuating means and said master cylinder thereby maintaining pressure on that portion of said liquid in said conduit between said brake actuating means and said member when said member is moved to close said conduit while the pressure on that portion of said liquid in said conduit between said member and said master cylinder may be reduced;
    (b) said member including pressure releasing means in said closed conduit adapted to maintain no more than a predetermined maximum pressure on that part of said liquid in said conduit between said brake actuating means and said member when said member is moved to close said conduit;
    (c) said member also including in said closed conduit pressure increasing means apart from actuation of said master cylinder which is adapted to re-apply pressure on said part of said liquid in said conduit between said member and said brake actuating means after actuation of said pressure releasing means.

2. In a hydraulic braking system having a closed conduit containing liquid, conventional movable brake actuating means connected with said conduit responsive to increases in pressure of said liquid for movement to apply the braking means of said system when applied, and a conventional master cylinder connected with said conduit actuatable by an operator for applying said pressure, the improvement that includes:
    (a) a member reciprocally supported within a portion of said conduit between said master cylinder and said brake actuating means for movement from a position opening said conduit to passage of said liquid therethrough to a position closing said conduit to such flow;
    (b) member actuating means operably connected with said member for moving the latter to said position closing said conduit and yieldably holding it in said position whereby the pressure on that part of said liquid in said conduit between said brake actuating means and said member will be held by said member;
    (c) said member actuating means including a spring for yieldably moving said member to said position closing said conduit, and for yieldably holding it in said position;
    (d) an element movable in a direction for moving said member from said position closing said conduit to said position opening said conduit under the influence of air at atmospheric pressure admitted to one side of said element and a reduction in air pressure at the opposite side; and
    (e) means for so admitting said air at atmospheric pressure to said one side of said element and for reducing the air pressure at the said opposite side thereof including a vacuum line communicating with said opposite side and a valve therein actuatable for opening and closing said opposite side to atmosphere and vacuum as desired.

3. In the invention defined in claim 2:
    (f) said member including pressure releasing means adapted to maintain no more than a predetermined maximum pressure on that part of said liquid in said conduit between said brake actuating means and said member when said member is moved to close said conduit.

4. In the invention defined in claim 2:
    (f) said member being yieldably movable when in said position closing said conduit responsive to changes in pressure in that portion of said liquid in said conduit between said brake actuating means and said member to compensate for said changes in pressure and thereby maintain a predetermined minimum pressure in that portion of said liquid.

5. In the invention defined in claim 4:
    (g) said member including pressure releasing means adapted to maintain no more than a predetermined maximum pressure in that portion of said liquid upon said member being moved to the limit of its yieldable movement by increased pressure in that portion of said liquid.

6. In a hydraulic braking system including a primary master cylinder, means for actuating said primary master cylinder, brake actuating means actuatable for actuating a frictional braking mechanism, and hydraulic connecting means connecting said primary master cylinder to said brake actuating means, the improvement that includes:
    (a) a second master cylinder operatively included in associated hydraulic connecting means, which second master cylinder is actuatable to hydraulically actuate associated brake actuating means independently of said primary master cylinder and which, when inoperative, is only a conduit for hydraulic fluid passing therethrough;
    (b) spring means operatively connected with said second master cylinder for controllable actuation thereof upon expansion of said spring means to actuate said associated brake actuating mean in a braking operation.

7. In the invention defined in claim 6.
    (c) said spring means being enclosed within a sealed chamber wherein said spring means reacts between a stationary side of said chamber and an opposed movable side thereof mounted for movement toward and away from said stationary side;

(d) pneumatic connecting means connecting said sealed chamber to a source of negative pressure whereby atmospheric pressure on the outside of said movable side will cause said movable side to move toward said stationary side thereby contracting said spring means reacting therebetween; and (e) valve means included in said pneumatic connecting means for disconnecting said sealed chamber from said source of negative pressure when desired.

8. In the invention defined in claim 6:

(c) said second master cylinder including a releasable check valve adapted to be released when the hydraulic pressure in that portion of hydraulic connecting means between said brake actuating means and said second master cylinder increases beyond a predetermined maximum while said second master cylinder is actuated thereby maintaining the pressure in portion of said hydraulic connecting means below said predetermined maximum.

9. A hydraulic braking system having a closed conduit containing liquid, movable brake actuating means connected with said conduit responsive to increases in pressure of said liquid for movement to move said brake actuating means in applying the braking system, including:

(a) a member reciprocally supported within said conduit for moment from passive position wherein no pressure is applied to said liquid in said conduit to an active position wherein pressure is applied to said liquid for moving said brake actuating means;

(b) member actuating means operably connected with said member for moving the latter to said active position and yieldably holding said member in said active position whereby pressure is applied to said liquid and said brake actuating means;

(c) said member actuating means including a spring for yieldably moving said member to said active position;

(d) an element movable in a direction for moving said member from said active position to said passive position under the influence of air at atmospheric pressure admitted to one side of said element and a reduction in air pressure at the opposite side; and (e) means for so admitting air at atmospheric pressure to said one side of said element and for reducing the air pressure at said opposite side thereof including a vacuum line communicating with said opposite side and a valve therein actuatable for opening and closing said opposite side to atmosphere and vacuum as desired.

References Cited

UNITED STATES PATENTS

| | | | |
|---|---|---|---|
| 2,285,781 | 6/1942 | Patrick | 188—152.15 |
| 2,301,037 | 11/1942 | Greene | 60—54.5 XR |
| 2,344,299 | 3/1944 | Groves | 60—54.6 |
| 2,396,897 | 3/1946 | Stelzer | 188—152.15 |
| 2,423,204 | 7/1947 | Rockwell | 60—54.5 XR |
| 2,963,115 | 12/1960 | Peras | 188—69 |
| 2,997,850 | 8/1961 | Hupp | 60—54.5 |
| 3,200,914 | 8/1965 | Downs et al. | 60—54.5 XR |

MARTIN P. SCHWADRON, *Primary Examiner.*

ROBERT R. BUNEVICH, *Assistant Examiner.*

U.S. Cl. X.R.

188—69, 152; 303—89